United States Patent [19]
Callaway, Sr. et al.

[11] Patent Number: 5,509,463
[45] Date of Patent: * Apr. 23, 1996

[54] SADDLE TYPE HEAT EXCHANGER

[76] Inventors: James K. Callaway, Sr.; James K. Callaway, Jr.; Danny W. Callaway, all of 8815 Emmott Rd., Houston, Tex. 77040

[*] Notice: The portion of the term of this patent subsequent to Aug. 13, 2008, has been disclaimed.

[21] Appl. No.: 489,707

[22] Filed: Jun. 13, 1995

Related U.S. Application Data

[63] Continuation of Ser. No. 943,054, Sep. 10, 1992, abandoned, which is a continuation of Ser. No. 741,998, Aug. 8, 1991, abandoned, which is a continuation-in-part of Ser. No. 297,758, Jan. 17, 1989, Pat. No. 5,038,853.

[51] Int. Cl.⁶ .............................. F28F 7/00; H02K 9/00; H02K 9/02; F04B 17/00
[52] U.S. Cl. .............................. 165/46; 165/86; 165/905; 165/169; 417/366; 417/370; 4/541.2; 4/541.3; 310/54; 310/64
[58] Field of Search .............................. 165/47, 86, 905, 165/46; 4/544, 545; 417/366, 367, 368, 369, 370, 371, 372; 310/54, 64

[56] References Cited

U.S. PATENT DOCUMENTS

| | | | |
|---|---|---|---|
| 2,763,214 | 9/1956 | White | 417/371 |
| 2,784,672 | 3/1957 | Wallace | 417/370 |
| 2,913,988 | 11/1959 | White | 417/368 |
| 3,127,530 | 3/1964 | White | 417/366 |
| 3,478,689 | 11/1969 | Ball | 417/372 |
| 4,213,498 | 7/1980 | Vandenbossche | 165/169 |
| 4,854,373 | 8/1989 | Williams | 417/370 |
| 4,858,254 | 8/1989 | Popovich et al. | 4/544 |
| 4,892,464 | 1/1990 | Schydlo | 417/371 |
| 5,038,853 | 8/1991 | Callaway, Sr. et al. | 165/46 |

*Primary Examiner*—John K. Ford
*Attorney, Agent, or Firm*—Kenneth A. Roddy

[57] ABSTRACT

A heat exchanger for use in combination with motor driven fluid pumps of the type having a motor with an outwardly curved upper surface. The heat exchanger has an arcuate heat exchange jacket formed of an inner wall, an outer wall, and a spacer frame sealed therebetween which has an open center section defining a hollow enclosed cavity. The jacket is configured to engage the exterior surface of the pump motor for maintaining heat exchange contact between the pump motor and the cavity. The jacket has a fluid inlet and one or more outlets. A venturi cross having a pair of tubular extensions may be connected to the intake port of the pump with one extension connected to the jacket inlet and the other extension to the jacket outlet to subject the jacket to negative pressure created by the venturi cross to draw a portion of the fluid through the jacket cavity and recirculate it through the pump. Alternatively, a cross having a pair of tubular extensions may be connected to the intake port of the pump and both extensions connected to a pair of jacket outlets in combination with a supply tee connected to the high pressure discharge conduit and to the jacket inlet to subject the jacket to the pressure differential between the pump intake port and the pump discharge port to pass a portion of the pressurized fluid through the jacket cavity and recirculate it through the pump. The supply tee may contain a thermostat to open and close fluid flow through the jacket.

22 Claims, 6 Drawing Sheets

SADDLE TYPE HEAT EXCHANGER

CROSS REFERENCE TO RELATED APPLICATION

This is a continuation of application Ser. No. 07/943,054, filed Sep. 10, 1992, abandoned, which is a continuation of Ser. No. 07/741,998, filed Aug. 8, 1991, now abandoned, which is a continuation-in-part of Ser. No. 07/297,758, filed Jan. 17, 1989, now U.S. Pat. No. 5,038,853.

BACKGROUND OF THE INVENTION

1. Field of the Invention

This invention relates generally to heat exchangers, and more particularly to an arcuate heat exchanger which engages the exterior of fluid pump motors and utilizes the heat produced by the motor to heat fluid circulated through the heat exchanger.

2. Brief Description of the Prior Art

Most spas, hot tubs, and therapy tubs which utilizes jet nozzles to circulate water to the tub have a circulating system utilizing a motor with a centrifugal pump which takes a suction from the bottom of the tub and delivers the water through an electrical heat exchanger, or heater, to the discharge nozzles in the tub. The electrical heaters have heating elements which wear out and have electrical wires which may become grounded. The heater is controlled by a thermostat which regulates the tub water temperature. The Consumer Products Safety Commission states that the maximum temperature for a hot tub should not exceed 104° F.

The commonly used thermostat is only accurate to within 3° F. A person in the tub will usually experience an uncomfortable cooling effect as the water reaches the lower limit (less than about 100° F.) to activate the heater, and then an uncomfortable rise in the water temperature as the heated water is discharged through the nozzles. Thus, the occupant is subjected to an endless cycle of cooling and heating as the heater cycles on and off. The constant cycling of the heater consumes significant energy and is expensive to operate.

The electric motor which powers the pump circulating the water produces heat during its operation which is roughly proportional to its horsepower rating. Typically, the coil of the motor will reach a temperature of about 196° F. and the motor housing or casing will reach a temperature of about 155° F. However, this energy is dissipated into the atmosphere by the motor casing and is wasted.

The present invention provides a means of recovering the wasted heat energy of the motor and utilizes it to heat the water being pumped and circulated to the tub. Thus, eliminates the need for an electric heater which results in conservation of energy, reduction in the cost of operation of the heated tub, and maintains the tub water at a substantially constant and comfortable temperature.

The pumps used in water circulation systems in the pool and spa industry are required to be of the "100% drain" type. In other words, the system including the pump must completely drain all water out of the system to prevent growth of bacteria. The high pressure side of the pump is referred to as the discharge end and the low pressure side is referred to as the intake, or suction end of the pump. The standard combination pump/motor has the high pressure (discharge) connection above the mid-point (usually at the top) and above the low pressure (intake) pump connection.

The present invention utilizes the suction end of the pump to completely drain the water from the heat exchanger, thus the heat exchanger in accordance with the present invention and meets the "100% drain" requirements of industry regulations.

There are several patents which disclose various heat exchange apparatus for motors, most of which are directed toward devices which merely cool an electric motor.

White, U.S. Pat. No. 3,127,530 discloses a cooling apparatus for motor driven pumps wherein the motor is of the type having a cooling fluid internally circulated within the rotor chamber of the motor. A sheet metal casing is installed around the motor housing and cooling fluid is pumped through the casing to cool the motor. Alternatively, if additional cooling is required, a length of tubing bent in a serpentine coil with fittings at each end is placed between the motor housing and the sheet metal casing and the hot fluid from the internal cooling circuit of the motor is recirculated through the coiled tubing and exposed to the cooling fluid in the casing and back to the rotor chamber.

Onsrud, U.S. Pat. No. 2,862,120 discloses a fluid cooled electric motor housing. The housing or casing of the motor is a pair of concentric annular steel shells supported in spaced relation by a plurality of longitudinal, circumferentially spaced baffle ribs welded therebetween.

Bone, U.S. Pat. No. 4,516,044 discloses a motor cooling apparatus comprising a single piece or two-piece metal housing having a cylindrical cavity which surrounds the exterior of the motor. The side wall of the cylindrical cavity is provided with a series of pairs of parallel circumferentially incomplete grooves joined together at one end and enclosed by the exterior of the motor casing to form a water channel for cooling the motor.

Vandenbossche, U.S. Pat. No. 4,213,498 discloses a plastic heat exchanger which can be tightly faced on a cylindrical member to control the temperature of the member which comprises two plastic sheets separated by a plurality of parallel ribs fused thereto to form a plurality of channels, rectangular in cross section, and a pair of cylindrical channels connected at each end of the channels normal to the axis of the channels. The outer plastic sheet is provided with a layer of insulating foam.

Williams, U.S. Pat. No. 4,854,373, discloses a crescent shaped heat exchanger made of welded sheet metal plates conforming to the shape of the motor. The longitudinal (bottom) edges of the heat exchanger are inclined in opposite directions relative to a horizontal plane passing through the longitudinal axis. In other words, one side slopes downwardly from front to back and the other side slopes downwardly from back to front. The lower end of each longitudinal end plate has a port so that water will drain toward both ports and water can be introduced through one port and discharged through the other. Since one pair of diagonally opposed corners of the heat exchanger are lower than the other diagonally opposed corners, the arc subtended by the inner curved plate is slightly greater than 180° when viewed transversely. This configuration is suggested to allow the device to snap fit onto the upper surface of the motor. However, the welded sheet metal construction would make this extremely difficult or impossible.

Because the Williams heat exchanger subtends slightly more than 180° past the mid-point of the pump motor, and both the intake and discharge ports are at the lowest point, one side of the Williams device would not drain when connected to pumps in accordance with the industry standard, since the standard motor driven pump has the high pressure (discharge) connection above the mid-point of the motor (usually at the top) and above the low pressure (intake) pump connection to meet the 100% drain requirement. Williams requires drilling and tapping the pump to make connections to the intake and discharge ports of the heat jacket, rather than being able to use the existing pump ports.

The present invention is distinguished over the prior art in general, and these patents in particular by a heat exchanger for use in combination with motor driven fluid pumps of the type having a motor with an outwardly curved upper surface. The heat exchanger has an arcuate heat exchange jacket formed of an inner wall, an outer wall, and a spacer frame sealed therebetween which has an open center section defining a hollow enclosed cavity. The jacket is configured to engage the exterior surface of the pump motor for maintaining heat exchange contact between the pump motor and the cavity. The jacket has a fluid inlet and one or more outlets. A venturi cross having a pair of tubular extensions may be connected to the intake port of the pump with one extension connected to the jacket inlet and the other extension to the jacket outlet to subject the jacket to negative pressure created by the venturi cross to draw a portion of the fluid through the jacket cavity and recirculate it through the pump. Alternatively, a cross having a pair of tubular extensions may be connected to the intake port of the pump and both extensions connected to a pair of jacket outlets in combination with a supply tee connected to the high pressure discharge conduit and to the jacket inlet to subject the jacket to the pressure differential between the pump intake port and the pump discharge port to pass a portion of the pressurized fluid through the jacket cavity and recirculate it through the pump. The supply tee may contain a thermostat to open and close fluid flow through the jacket.

SUMMARY OF THE INVENTION

It is therefore an object of the present invention to provide a heat exchanger which will conserve energy by utilizing the waste heat energy given off by a pump motor to heat the fluid being pumped and utilizes the fluid being pumped to cool the pump motor.

It is another object of this invention to provide a heat exchanger for spas, hot tubs, and therapy tubs which eliminates the need for an electric heater to heat the tub water.

Another object of this invention is to provide a heat exchanger for spas, hot tubs, and therapy tubs which utilizes the suction end of the pump to completely drain the water from the heat exchanger in accordance with "100% drain" requirements of industry regulations.

Another object of this invention is to provide a heat exchanger for spas, hot tubs, and therapy tubs which will significantly reduce the cost of operation of the heated tub.

Another object of this invention is to provide a heat exchanger for spas, hot tubs, and therapy tubs which will effectively maintain the tub water at a substantially constant and comfortable temperature.

Another object of this invention is to provide a saddle type heat exchanger which is quickly and easily installed on the casing of a motor without tools and is quickly and easily connected to existing piping systems.

Another object of this invention is to provide a saddle type heat exchanger which is installed on the casing of a motor and onto which motor components and controls may be mounted and through which wiring connections may be safely made.

A further object of this invention is to provide a heat exchanger which is formed of electrically non-conductive materials and safe to operate in close proximity to electric motors.

A still further object of this invention is to provide a heat exchanger which is simple in construction, economical to manufacture, and rugged and reliable in operation.

Other objects of the invention will become apparent from time to time throughout the specification and claims as hereinafter related.

The above noted objects and other objects of the invention are accomplished by a heat exchanger for use in combination with motor driven fluid pumps of the type having a motor with an outwardly curved upper surface. The heat exchanger has an arcuate heat exchange jacket formed of an inner wall, an outer wall, and a spacer frame sealed therebetween which has an open center section defining a hollow enclosed cavity. The jacket is configured to engage the exterior surface of the pump motor for maintaining heat exchange contact between the pump motor and the cavity. The jacket has a fluid inlet and one or more outlets. A venturi cross having a pair of tubular extensions may be connected to the intake port of the pump with one extension connected to the jacket inlet and the other extension to the jacket outlet to subject the jacket to negative pressure created by the venturi cross to draw a portion of the fluid through the jacket cavity and recirculate it through the pump. Alternatively, a cross having a pair of tubular extensions may be connected to the intake port of the pump and both extensions connected to a pair of jacket outlets in combination with a supply tee connected to the high pressure discharge conduit and to the jacket inlet to subject the jacket to the pressure differential between the pump intake port and the pump discharge port to pass a portion of the pressurized fluid through the jacket cavity and recirculate it through the pump. The supply tee may contain a thermostat to open and close fluid flow through the jacket.

DESCRIPTION OF THE PREFERRED EMBODIMENT

Figure 1:
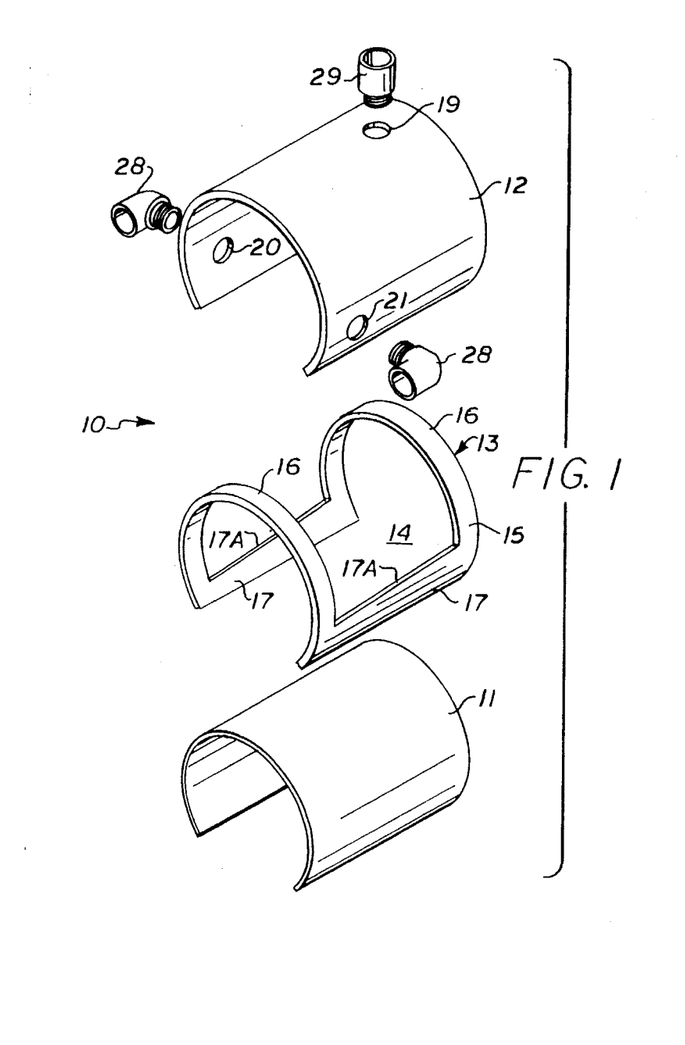
FIG. 1 is an exploded isometric view of a heat exchanger in accordance with the present invention showing one embodiment of the water jacket.
Figure 2:
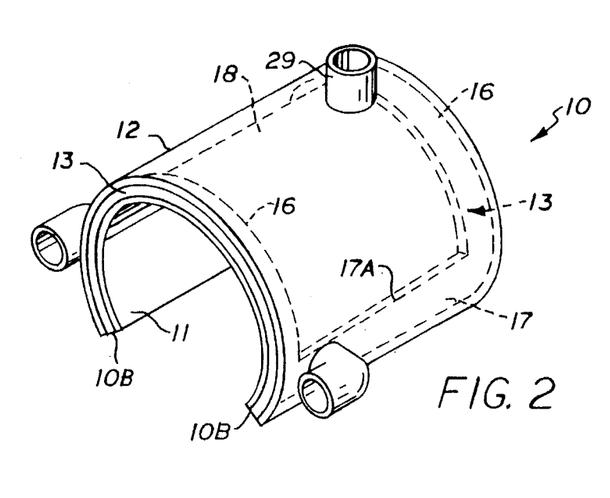
FIG. 2 is an isometric view of the heat exchanger water jacket of FIG. 1 in the assembled condition.
Figure 3:
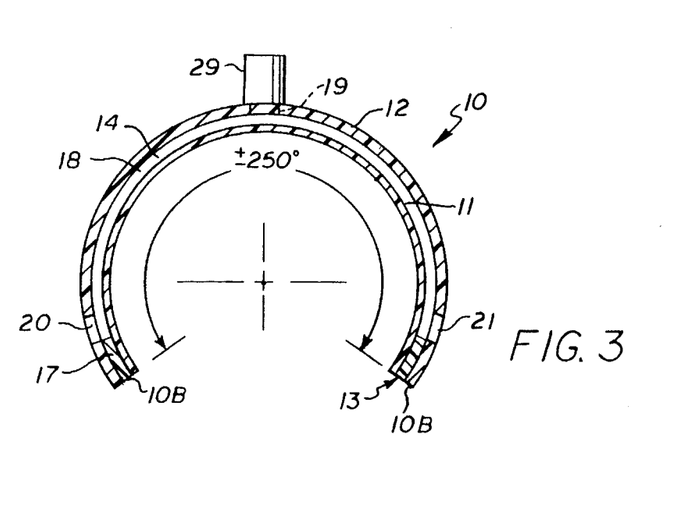
FIG. 3 is a transverse cross section of the heat exchanger water jacket.

Referring now to the drawings by numerals of reference, there is shown in FIGS. 1, 2, and 3, the construction of a preferred, semi-cylindrical, water jacket member of the heat exchanger. The heat exchanger water jacket 10 is preferably constructed of PVC (polyvinylchloride), but other suitable materials may be used. The water jacket 10 has a curved inner wall 11 and a curved outer wall 12 which are spaced apart concentrically by a curved, generally open, spacer frame 13. The spacer frame 13 has an open center section 14 surrounded by a peripheral flange 15 defined by opposed arcuate end portions 16 and opposed, parallel, longitudinal side portions 17. The heat exchanger jacket 10 is assembled by applying epoxy glue or other suitable waterproof adhesive materials along the outer sides of the upper surface of the inner wall 11 and fitting the spacer frame 13 onto the inner wall. Epoxy glue is then applied along the outer sides of the underside of the outer wall 12, or to the upper surfaces of the spacer frame 13, and fitting the outer wall onto the spacer frame. The outer edges of the inner wall 11, spacer frame 13, and outer wall 12 are sized to provide a smooth even peripheral edge.

Once the inner wall 11, outer wall 12, and spacer frame 13 have been secured together, a hollow watertight water jacket 10 is formed which has an interior chamber 18 defined by the end and side portions 16 and 17 of the spacer frame 13 into which water to be heated is introduced. The outer wall 12 is provided with an aperture 19 through its top portion and an aperture 20 and 21 through each opposite side near its longitudinal edges. The apertures 19, 20 and 21 are threaded to receive conventional conduit fittings. In some applications, the top aperture 19 may not be used, and the outer wall 12 may be manufactured without this aperture. Optionally the aperture 19 may be plugged when not used.

The upper edge 17A of the longitudinal side portions 17 of the spacer frame 13 are inclined relative to a horizontal plane passing through the longitudinal axis such that they each slope downwardly from one arcuate end 16 to the other, allowing water to drain toward both apertures 20 and 21.

Figure 4:
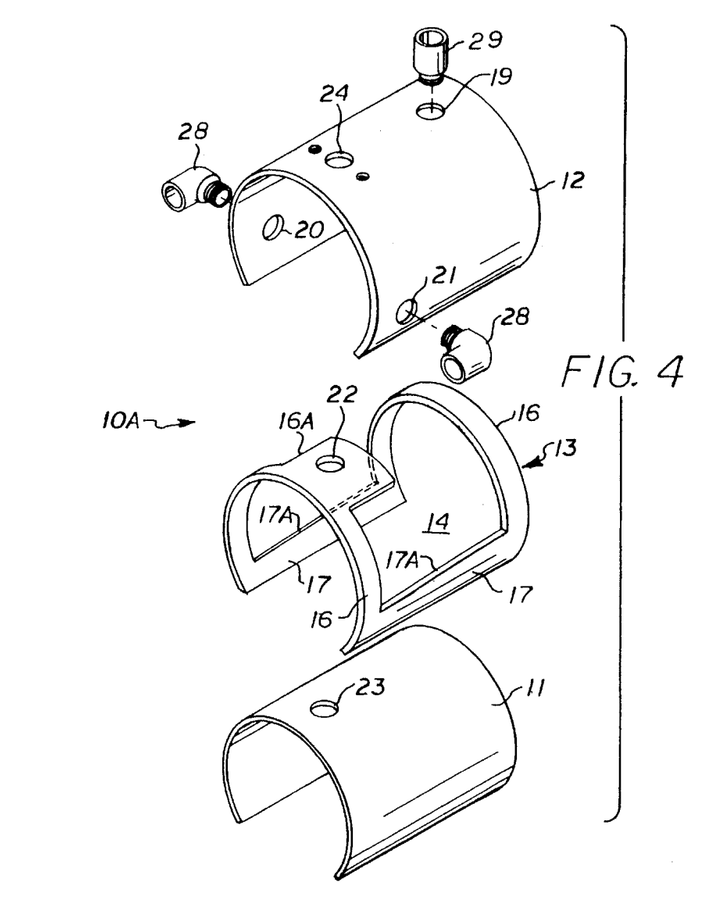
FIG. 4 is an exploded isometric view of a heat exchanger in accordance with the present invention showing a modification of the water jacket.
Figure 5:
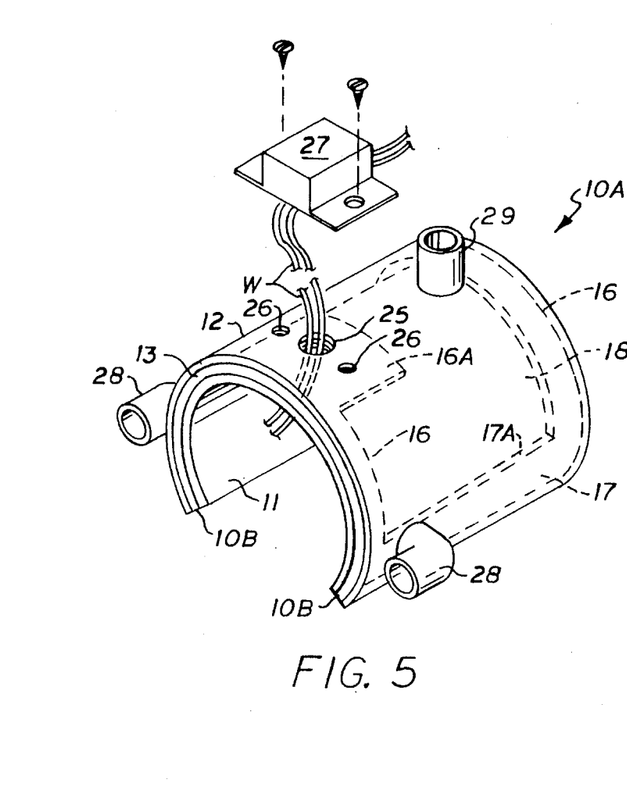
FIG. 5 is an isometric view of the heat exchanger water jacket of FIG. 4 in the assembled condition.

Alternatively, as seen in FIGS. 4 and 5, the water jacket 10A may have a spacer frame 13 having an arcuate extension 16A at its top end which extends a distance into the open center section 18. A hole 22 extends through the extension 16A and the inner wall 11 and outer wall 12 are provided with holes 23 and 24, respectively, therethrough in axial alignment with the hole 22. When the inner wall 11, spacer frame 13, and outer wall 12 are secured together the holes 22, 23, and 24, form a passageway 25 in the water jacket 10A through which wires W may be passed. The combined wall thicknesses of the extension 16A and walls 11, 12 allow for drilling and tapping screw holes 26 whereby motor components, such as an air switch 27, may be mounted on the exterior of the water jacket 10A (FIG. 5) and connected to the motor M by extending the wires W through the passageway 25.

Elbow members 28 are sealingly installed in the side apertures 20 and 21 and their open ends are positioned in the direction of the pump. A tubular connector 29 is sealingly installed in the aperture 19. In some installations, the top aperture 19 is used as the water jacket intake port and both side apertures 20, 21 are used as outlets or discharge ports. In other installations, one side aperture 20 or 21 is used as the intake port and the other side aperture is used as the outlet or discharge port. In the latter situation, the top aperture 19 is not used, and the outer wall 12 may be manufactured without this aperture. Optionally the aperture 19 may be plugged when the side apertures 20, 21 are used as intake and outlet ports.

Figure 6:
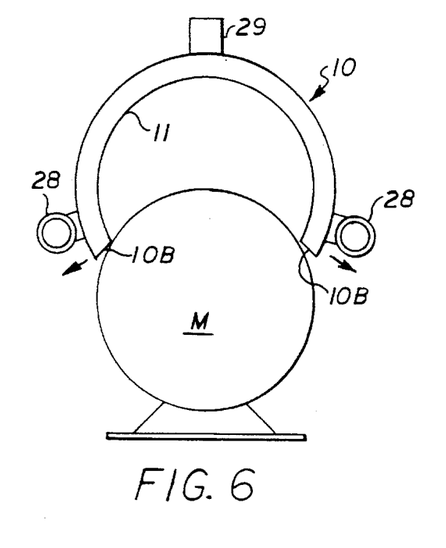
FIG. 6 is a front elevation of the heat exchanger water jacket being installed on the upper portion of a pump motor.
Figure 7:
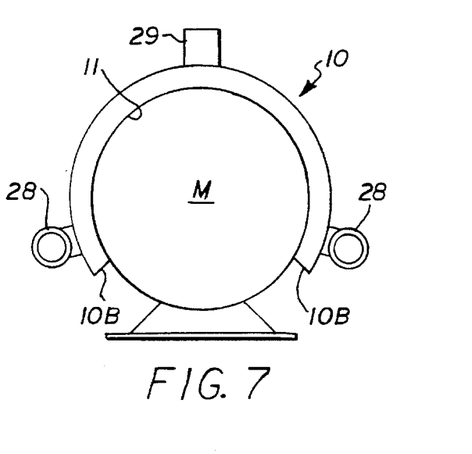
FIG. 7 is a transverse cross section of the heat exchanger water jacket installed on the upper portion of a pump motor.
Figure 8:
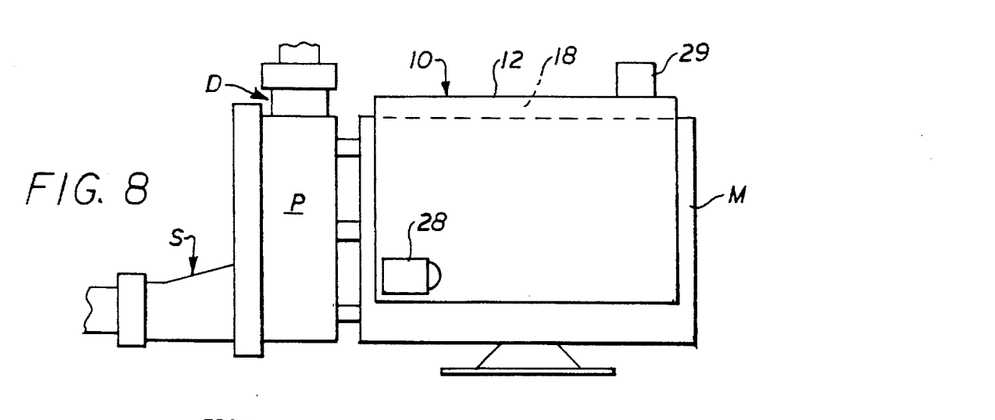
FIG. 8 is a side elevation view of the heat exchanger water jacket installed on the upper portion of a pump motor.

Referring now to FIGS. 3, 6, and 7, when viewed transversely, the inner wall 11 of the arcuate water jacket 10 subtends approximately 250° and the bottom edge 10B of the longitudinal sides are angled. The inside diameter of the inner wall 11 is approximately the same as the diameter of the motor housing or casing. The material of the water jacket 10 makes it sufficiently resilient such that when placed on the curved upper portion of the motor M, and pressed downwardly, it will snap into place over the rounded portion of the motor. The parallel side edges of the water jacket flex outwardly as they pass the mid-section of the motor. Since the water jacket subtends the motor approximately 250° it will be resiliently and firmly held in place against the casing of the motor. The water jacket 10 may also be installed by sliding it axially onto the motor from one end. The resiliency of the water jacket also allows it to be easily removed by pulling outwardly and upward on the side edges. Should it be desirable to further secure the water jacket on the motor, suitable mastic or adhesive may be applied prior to installation. FIG. 8, shows the water jacket 10 installed on the motor M as seen from the side.

One of the features of the present heat exchanger is that it utilizes the suction end S of the pump P to drain the water from the water jacket such that the heat exchanger meets the "100% drain" requirement of industry regulations. There are several ways that the water jacket can be connected to the pump P and to the existing high pressure nozzle jet conduit.

Figure 9:
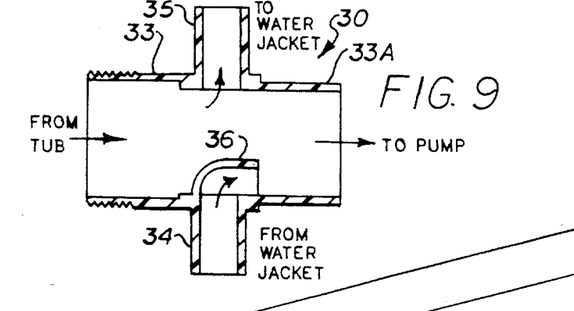
FIG. 9 is a cross section through a venturi suction cross for use in connecting the heat exchanger to the pump suction end.
Figure 10:
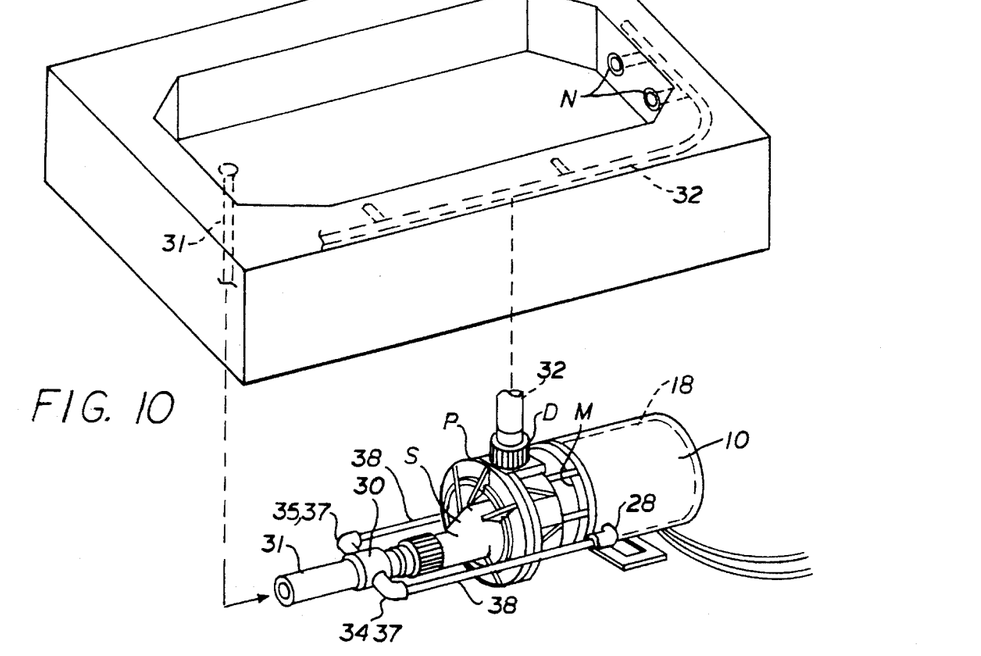
FIG. 10 is a perspective view showing the heat exchanger connected to a conventional tub using only the venturi suction cross.
Figure 11:
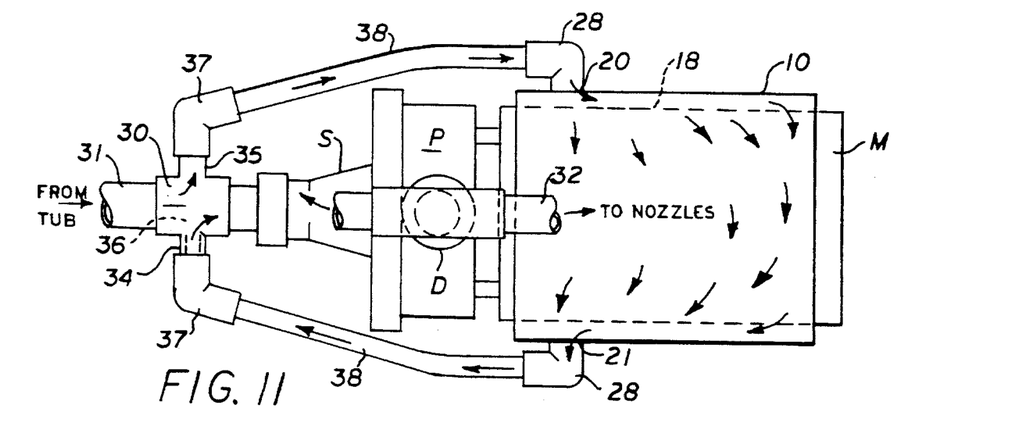
FIG. 11 is a schematic top view of the heat exchanger showing the fluid flow path with the connections of FIG. 10.

One method of connecting the heat exchanger to the existing circulation system is to use a venturi suction cross 30 as shown in FIG. 9, and connect it in combination with the heat exchanger as shown in FIG. 10 to create flow path as seen in FIG. 11. The conventional jetted tub or spa has a reservoir or tub T with an intake conduit 31 connected to the lower portion of the tub which, in the conventional hook-up, extends to the suction port S of the centrifugal water pump P external of the tub. The motor M connected to the water pump P drives the pump impeller to draw water through the conduit 31 into the low pressure side (suction port S) of the pump and pass it to the high pressure side and discharge the pressurized water from the discharge port D via the high pressure or discharge conduit 32 forcefully expelling it through a plurality of water jet nozzles N back into the tub T.

Referring to FIG. 9, the venturi suction cross 30 has an inlet end 33 and an outlet end 33A through which fluid is drawn by the pump, and a pair of opposed tubular extensions 34 and 35 in fluid communication with the interior of the cross 30. A tubular projection 36 on the interior of the cross extends from the side opening of one tubular extension 34. The projection 36 extends inwardly and rearwardly from the cross side wall in the direction of the fluid flow toward the pump suction port to create a venturi effect on the tubular extension 34. An elbow 37 is installed on each tubular extension 34 and 35 and their open ends are positioned in the direction of the elbows 28 on the heat exchanger jacket 10 which is installed on the casing of the motor M. The venturi suction cross 30 is sealingly installed on the intake conduit 31 which is normally connected to the suction port S of the centrifugal water pump P.

The inlet and outlet ends of the cross may be provided with threaded ends so that it can be installed using conventional unions, or may be configured to be slip fitted and cemented onto the intake conduit. The cross 30 should be installed as close as possible to the suction port S of the pump P. Most conventional pumps have the suction port below the midpoint of the pump and motor. However, it is important that the cross be positioned lower than the elbows 28 of the heat exchanger to assure 100% draining of the water jacket. Short lengths of conduit 38 are sealingly connected at each end to the elbows 37 and 28. The conduit 38 should extend angularly downward from the water jacket 10 to the cross 30. In this particular installation, the discharge port D of the pump P is connected to the high pressure or discharge conduit 32 as in a conventional installation, and the top aperture (19, 29) on the water jacket is not required. If the water jacket has a top port, it should be plugged.

FIG. 11 shows the fluid flow path through water jacket 10, as seen from the top, when the venturi suction cross 30 is used. When the pump P is circulating water, the motor M drives the pump impeller to draw water through the conduit 31 into the low pressure side (suction port S) of the pump and pass it to the high pressure side and discharge the pressurized water from the discharge port D via discharge conduit 32 forcefully expelling it through a plurality of water jet nozzles N back into the tub T. As water is drawn through the cross 30, the venturi effect on the tubular extension 34 causes a pressure differential between the tubular extensions 34 and 35 which are connected by conduit 38 to the apertures of the water jacket.

Thus, the water jacket 10 is subjected to a pressure differential between the apertures 20 and 21. A portion of the water flowing through the cross 30 is drawn, or sucked, from the water jacket 10 through the tubular extension 34, enters the cross 30, and is mixed with the water being pumped, and at the same time water is pulled through the tubular extension 35, into the water jacket 10 to complete the circuit. Water entering the water jacket 10 will fill the interior cavity 18 where it picks up the heat energy transferred through the inner wall 11 of the water jacket from the motor casing. The heated water from the jacket 10 enters the cross 30 and is drawn by the pump impeller into the low pressure side (suction port S) of the pump and passed to the high pressure side and is discharged from the pump discharge port D via discharge conduit 32 and expelled through the water jet nozzles N back into the tub T.

Figure 12:
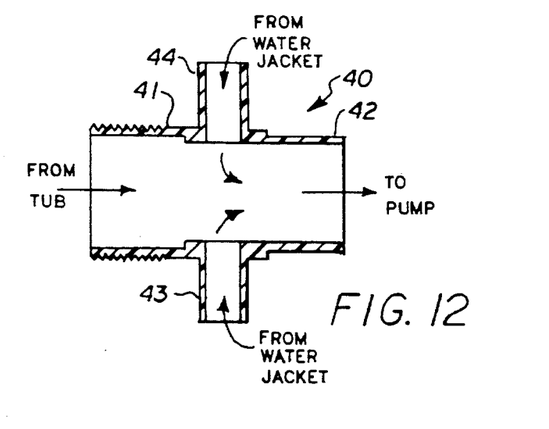
FIG. 12 is a cross section through a suction cross for use in connecting the heat exchanger to the pump suction end.
Figure 13:
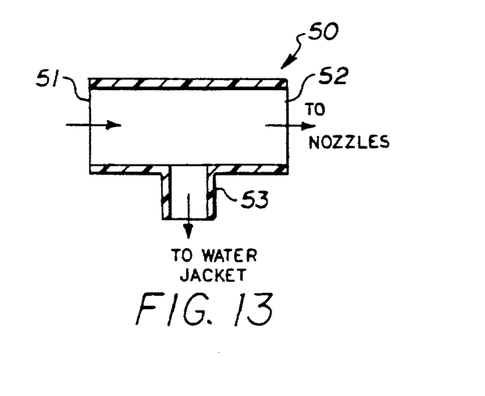
FIG. 13 is a cross section through a supply tee for use in connecting the intake of the heat exchanger to the nozzle jet high pressure conduit.
Figure 14:
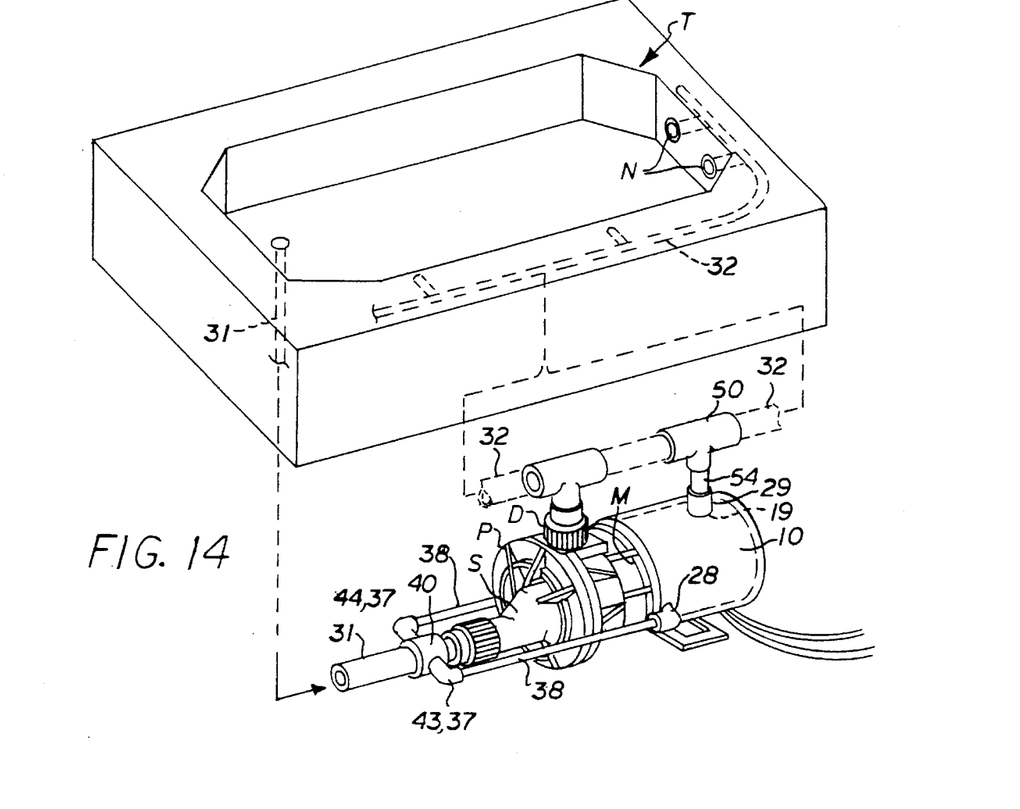
FIG. 14 is a perspective view showing the heat exchanger connected to a conventional tub using the suction cross and supply tee.
Figure 15:
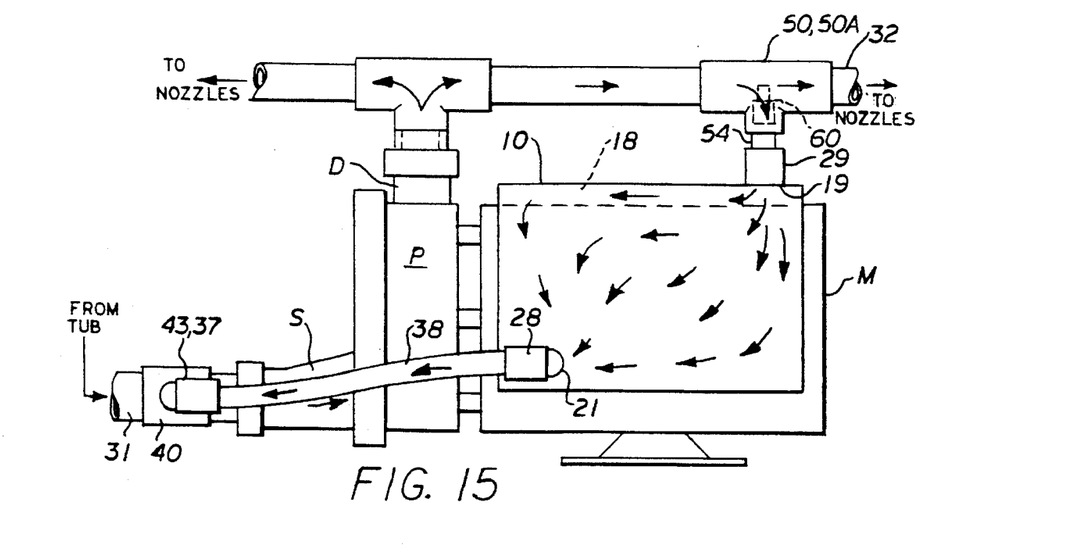
FIG. 15 is a schematic side view of the heat exchanger showing the fluid flow path with the connections of FIG. 14.

Another method of connecting the heat exchanger to the existing circulation system is to use a suction cross 40 and a supply tee 50, as shown in FIGS. 12 and 13 respectively, and connect them in combination with the heat exchanger as shown in FIG. 14 to create flow path as seen in FIG. 15. In this installation, the suction cross 40 does not have a venturi, and the water jacket (FIG. 2) having the top aperture 19 is used.

As seen in FIGS. 12 and 14, the suction cross 40 has an inlet end 41 and an outlet end 42 through which fluid is drawn by the pump, and a pair of opposed tubular extensions 43 and 44 in fluid communication with the interior of the cross 40. An elbow 37 is installed on each tubular extension 43 and 44 and their open ends are positioned in the direction of the elbows 28 on the heat exchanger 10 which is installed on the casing of the motor M. The suction cross 40 is sealingly installed on the intake conduit 31 which is normally connected to the suction port S of the centrifugal water pump P.

The inlet and outlet ends of the suction cross 40 may be provided with threaded ends so that it can be installed using conventional unions, or may be configured to be slip fitted and cemented onto the intake conduit 31. The cross 40 should be installed as close as possible to the suction port S of the pump P and be positioned lower than the elbows 28 of the heat exchanger to assure 100% draining of the water jacket. Short lengths of conduit 38 are sealingly connected at each end to the elbows 37 and 28. The conduit 38 should extend angularly downward from the water jacket 10 to the cross 40.

As previously described, in the conventional hook-up, the high pressure side or discharge port D of the pump P is connected to the discharge conduit 32 to discharge pressurized water through the high pressure or discharge conduit supplying the water jet nozzles N. In this particular installation, the discharge port D of the pump is connected as usual, and in addition, the supply tee 50 (FIG. 13) is connected into the high pressure or discharge conduit 32.

As seen in FIG. 13, the supply tee 50 has an inlet end 51 and outlet end 52 through which fluid is passed under high pressure, and a smaller diameter outlet end 53. The inlet and outlet ends 51 and 52 of the tee 50 are sealingly installed in the high pressure or discharge conduit 32. The inlet and outlet ends 51 and 52 may be configured to be slip fitted and cemented onto the conduit, or may be provided with threaded ends so that it can be installed using conventional unions. The supply tee 50 should be installed as close as possible to the motor M. A short length of conduit 54 is sealingly connected at each end to the reduced outlet 53 of the tee 50 and the female end of the connection 29 on the top of the water jacket 10.

Thus, in this particular installation, both side apertures 20, 21 of the water jacket 10 are connected to the cross 40 and both serve as outlets or discharge ports, and the top aperture 19 is connected via supply tee 50 to the high pressure or discharge conduit 32 and serves as the inlet port of the water jacket.

FIG. 15 shows the fluid flow path through water jacket, as seen from the side, when the suction cross 40 and supply tee 50 are used. When the pump P is circulating water, the motor M drives the pump impeller to draw water through the conduit 31 into the low pressure side (suction port S) of the pump and pass it to the high pressure side and discharge the pressurized water from the discharge port D via discharge conduit 32 forcefully expelling it through a plurality of water jet nozzles N back into the tub T. Since the top aperture 19 of the water jacket is connected to the high pressure conduit 32 and the side apertures 20 and 21 are connected to the low pressure or suction end of the pump, the water jacket is subjected to a pressure differential between the inlet aperture 19 and the side outlets 20 and 21.

As water is drawn through the cross 40 by the pump P and discharged through the discharge conduit 32 to the nozzles, a portion of the water flowing through the supply tee 50 is drawn, or sucked, into the water jacket 10 through the conduit 54 at its top end. Water entering the water jacket will fill the interior cavity 18 where it picks up the heat energy transferred through the inner wall 11 of the water jacket from the motor casing. At the same time, water passes from the water jacket through the outlets 20, 21 and tubular extensions 43, 44 and enters the cross 40, where it is mixed with the water being pumped to complete the circuit. The heated water from the jacket 10 enters the cross 40 and is drawn by the pump impeller into the low pressure side (suction port S) of the pump and passed to the high pressure side and is discharged from the pump discharge port D via discharge conduit 32 and expelled through the water jet nozzles N back into the tub T.

Figure 16:
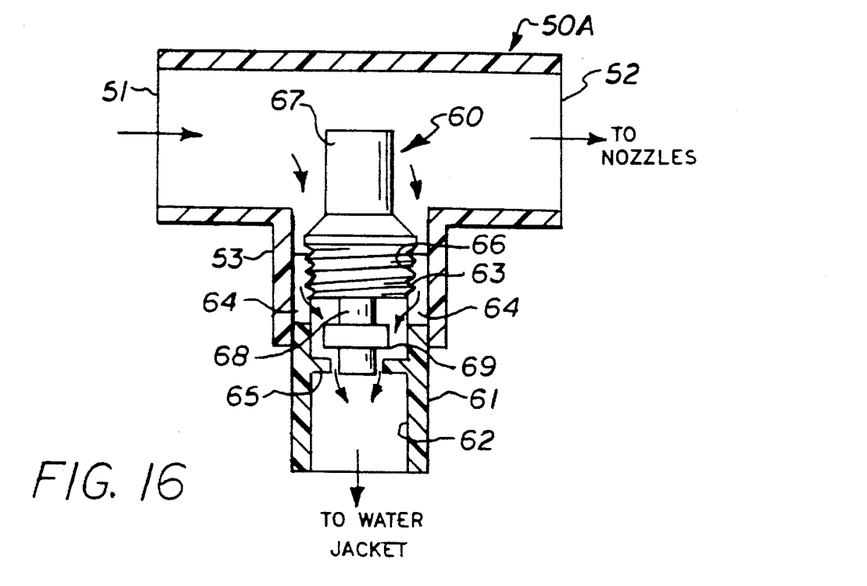
FIG. 16 is a cross section through a supply tee containing a thermostat for controlling the flow of fluid into the water jacket, shown with the thermostat in the open position.
Figure 17:
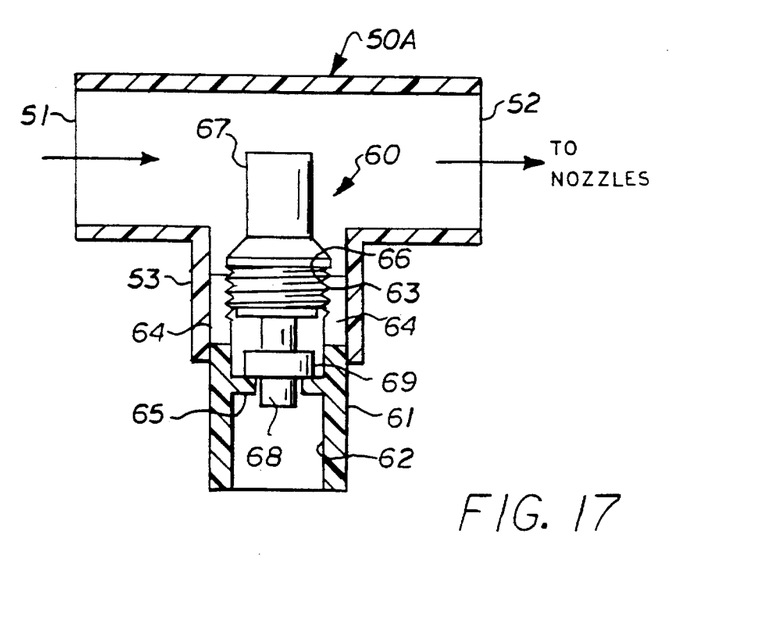
FIG. 17 is a cross section through the supply tee containing a thermostat, shown with the thermostat in the closed position.

Referring now to FIGS. 15, 16, and 17, A supply tee 50A may be provided which has a thermostat 60 to more accurately control the temperature of the water circulated in the system and to insure that to water not exceed the maximum of 104° F., as recommended by the Consumer Products Safety Commission. The thermostatically controlled supply tee 50A would be used in the installation illustrated in FIG. 14 and described above wherein the supply tee is installed in the discharge conduit 32 supplying the nozzles.

As seen in FIGS. 16 and 17, the thermostatically controlled supply tee 50A has an inlet end 51, and outlet end 52 through which fluid is passed under high pressure, and a second outlet end 53. The inlet and outlet ends 51 and 52 of the tee 50A are sealingly installed in the high pressure or discharge conduit 32. As previously described, the inlet and outlet ends 51 and 52 may be configured to be slip fitted and cemented onto the conduit, or may be provided with threaded ends so that it can be installed using conventional unions.

An tubular adapter housing 61 is sealingly installed in the second outlet 53. The adapter housing 61 has a central bore 62 and internal threads 63 at the upper end of the bore. The side wall of the housing 61 has a plurality of slots 64 which extend downwardly from the top end. The bore 62 has a reduced diameter portion which defines an annular valve seat 65 in the interior of the housing 61 below the threaded portion 63.

The thermostat member 60 is formed of brass or other suitable heat conductive material and has external threads 66 on the exterior of the thermostat body. A reduced diameter cylindrical neck portion 67 extends upwardly from the threaded portion 66. A diaphragm and spring (not shown) mounted inside the body of the thermostat 60 are operatively connected to a plunger rod 68 which extends slidably through the bottom of the thermostat body and a valve member 69 is connected to the lower end of the plunger rod. The diameter of the valve member 69 is larger than the bore through the valve seat 65. The interior components of the thermostat 60 are conventional in the art of thermostat control valves, and are therefore not shown in detail. The preferred thermostat 60 is of the wax filled type with the wax formulated to expand when it reaches a predetermined temperature, such as 104° F.

The thermostat member 60 is threadedly and sealably installed in the upper portion of the housing 61 and positioned such that the valve member 69 is a predetermined distance above the valve seat 65. As seen in FIG. 16, the housing 61 is sealingly installed in the second outlet 53 of the supply tee 50A and positioned such that the cylindrical neck portion 67 of the thermostat is in the fluid flow path of the tee. The bore 62 of the housing 61 is connected to the conduit 54 extending from the water jacket 10. A fluid flow path is formed around the exterior of the thermostat body through the slots 64 and around the valve member 69 and through the conduit 54 into the water jacket 10.

When the valve 69 is in the raised position (FIG. 16), water from the pump discharge D flowing through the conduit 32 passes through the tee 50A and a portion of the water is drawn through the second outlet 53 of the tee by the pressure differential in the water jacket 10. When the temperature of the water passing through the tee reaches 104° F., the wax expands and pushes the plunger rod 68 down to engage the valve member 69 on the valve seat 65 in sealing relation to shut off the flow to the water jacket (FIG. 17). In this position, only the water in the tub is recirculated by the pump.

As the unheated water flowing through the tee 50A begins to cool, the wax inside the thermostat will contract causing the diaphragm and spring to pull the plunger rod 68 upwardly to raise the valve member 69 off the valve seat 65 to open the fluid flow path to the water jacket 10 so that it can be heated.

While this invention has been described fully and completely with special emphasis upon a preferred embodiment, it should be understood that within the scope of the appended claims the invention may be practiced otherwise than as specifically described herein.

We claim:

1. A heat exchanger for use in combination with motor driven fluid pumps of the type having a motor with an outwardly curved upper surface, the heat exchanger comprising:

an arcuate heat exchange jacket formed of resilient material having parallel longitudinal side edges and a hollow enclosed cavity surrounded by a curved inner wall conforming generally to the shape of said pump motor, a curved outer wall in concentric spaced relation to said inner wall, arcuate end walls at each end, and longitudinal side walls, each of said inner wall, said outer wall, and said longitudinal side walls terminating at said parallel longitudinal side edges, said jacket being sufficiently resilient such that when placed on the curved upper surface of said pump motor and pressed downwardly, it will snap into place over the curved upper surface of the motor and engage the exterior surface of said pump motor for maintaining heat exchange contact between said pump motor and a fluid within said cavity, the parallel longitudinal side edges of said heat exchange jacket flexing outwardly as they pass the mid section of the motor, fluid inlet means on said jacket for directing a portion of the fluid being pumped into said cavity, fluid outlet means on said jacket for directing heated fluid out of said jacket, said curved outer wall having an aperture through each opposite side near the lower ends of one said arcuate end wall and at least one said aperture adapted to be connected to said fluid outlet means, said parallel longitudinal side edges having parallel interior surfaces inclined in the same direction at an angle relative to a longitudinal axis of said motor to drain fluids toward both said apertures near said one arcuate end wall, and means for operatively connecting said fluid inlet and fluid outlet means to said motor driven pump to create a pressure differential within said jacket cavity between said fluid inlet and outlet means to introduce fluid into said cavity and draw said fluid from said cavity and recirculate it through said pump.

2. A heat exchanger for use in combination with motor driven fluid pumps of the type having a motor with an outwardly curved upper surface, the heat exchanger comprising:

an arcuate heat exchange jacket having a curved inner wall conforming generally to the shape of said motor and having arcuate ends and longitudinal sides, a curved outer wall having arcuate ends and longitudinal sides in concentric spaced relationship to said inner wall, and a curved spacer frame having an open center section surrounded by a peripheral flange defined by opposed arcuate end portions and opposed parallel longitudinal side portions, said spacer frame sealed between the arcuate ends and longitudinal sides of said inner wall and said outer wall to join them together in spaced relation and its open center section defining a hollow enclosed cavity, said jacket configured to closely conform to and engage the exterior surface of said pump motor for maintaining heat exchange contact between said pump motor and a fluid within said cavity, fluid inlet means on said jacket for directing a portion of the fluid being pumped into said cavity, fluid outlet means on said jacket for directing heated fluid out of said jacket, said curved outer wall having a pair of apertures through each opposite longitudinal side near the bottom thereof adapted for connection to said fluid inlet means or said fluid outlet means and said spacer frame longitudinal side portions having parallel interior surfaces inclined in the same direction at an angle relative to a longitudinal axis of the motor to drain fluids toward both said apertures, and means for operatively connecting said fluid inlet and fluid outlet means to said motor driven pump to create a pressure differential within said jacket cavity between said fluid inlet and outlet means to introduce fluid into said cavity and draw said fluid from said cavity and recirculate it through said pump.

3. The heat exchanger of claim 2 in which said spacer frame has an arcuate extension at its top end which extends a distance into the open center section such that the combined thicknesses of said inner wall, said extension, and said outer wall form a thick portion on said heat exchange jacket of sufficient thickness to allow said jacket to be drilled and tapped to receive mounting hardware, whereby motor components or controls may be mounted onto said heat exchange jacket.

4. The heat exchanger of claim 3 including an aperture extending through said thick portion to form a passageway through said jacket isolated from fluid within said cavity and through which wires may be passed to connect the interior of said motor to motor components or controls mounted exterior of said motor.

5. A heat exchanger for use in combination with motor driven fluid pumps of the type having a motor with an outwardly curved upper surface, the heat exchanger comprising:

an arcuate heat exchange jacket having a hollow enclosed cavity, said jacket configured to closely conform to and engage the exterior surface of said pump motor for maintaining heat exchange contact between said pump motor and a fluid within said cavity, fluid inlet means on said jacket for directing a portion of the fluid being pumped into said cavity, fluid outlet means on said jacket for directing heated fluid out of said jacket, and a venturi cross member operatively connecting said fluid inlet and fluid outlet means to the intake port of said pump allowing fluid to flow therethrough and having a first and second tubular extension each with one end in fluid communication with the fluid flowing therethrough and said venturi cross having venturi means positioned in the fluid flow path relative to the second said tubular extension to create negative pressure therein, said first tubular extension connected at its other end to said fluid inlet means, and said second tubular extension connected at its other end to said fluid outlet means, whereby said heat exchange jacket is subjected the negative pressure created by said venturi to draw a portion of the fluid through said first tubular extension and said fluid inlet means and into said cavity and from said cavity through said second tubular extension back into said venturi cross and recirculate it through said pump.

6. A heat exchanger for use with a motor driven fluid pump of the type having a low pressure intake port and a high pressure discharge port, wherein the pump motor has an outwardly curved upper surface, said heat exchanger comprising:

an arcuate heat exchange jacket formed of resilient plastic material;

said jacket having a hollow enclosed cavity surrounded by an arcuate curved inner wall having a diameter approximately the same as the pump motor outwardly curved upper surface, an outer wall in spaced relation to said inner wall, end walls at each end, and parallel laterally spaced longitudinal bottom walls, said walls joined together to form a unitary structure;

said jacket configured to subtend the curved upper surface of the pump motor when installed thereon to maintain heat exchange relationship between the pump motor and a fluid within said cavity with said parallel laterally spaced longitudinal bottom walls of said heat exchange jacket disposed in laterally opposed parallel relation adjacent a horizontal axis extending through the mid section of the pump motor;

a fluid inlet on said jacket in fluid communication with said cavity and connected with the pump for directing a portion of the pumped fluid into said cavity; and at least one fluid outlet on said jacket in fluid communication with said cavity and connected with the existing pump intake port for directing fluid from said cavity to the pump intake port;

said fluid inlet and said at least one fluid outlet connected in fluid communication with the pump to create a pressure differential within said jacket cavity between said fluid inlet and said at least one fluid outlet to introduce fluid into said cavity and draw fluid from said cavity and recirculate it through the pump.

7. The heat exchanger of claim 6 wherein said jacket is formed of plastic material sufficiently resilient such that when pressed downwardly on the curved upper surface of the pump motor, the parallel laterally spaced longitudinal bottom walls of said heat exchange jacket will flex outwardly and pass the mid section of the pump motor to enable said jacket to snap into place over the curved upper surface of the pump motor for maintaining the heat exchange relationship between the pump motor and a fluid within said cavity.

8. The heat exchanger of claim 6 including discharge connection means having one end connected with the existing pump discharge port for receiving a portion of the fluid being discharged by the pump and another end connected with said jacket fluid inlet for directing it into said cavity, and intake port connection means connected with the existing pump intake port and with said at least one fluid outlet for directing fluid from said cavity to the existing pump intake port.

9. The heat exchanger of claim 8 wherein there are two said fluid outlets each connected with the existing pump intake port through said intake port connection means.

10. A heat exchanger for use with a motor driven fluid pump of the type having a low pressure intake port and a high pressure discharge port, wherein the pump motor has an outwardly curved upper surface, said heat exchanger comprising:

an arcuate heat exchange jacket formed of resilient material;

said jacket having a hollow enclosed cavity surrounded by a curved inner wall conforming generally to the shape of the pump motor outwardly curved upper surface, an outer wall in spaced relation to said inner wall, end walls at each end, and parallel laterally spaced longitudinal bottom walls, said walls joined together to form a unitary structure;

said jacket configured to subtend the curved upper surface of the pump motor when installed thereon to maintain heat exchange relationship between the pump motor and a fluid within said cavity with said parallel laterally spaced longitudinal bottom walls of said heat exchange jacket disposed in laterally opposed parallel relation adjacent a horizontal axis extending through the mid section of the pump motor;

fluid inlet means on said jacket in fluid communication with said cavity for directing a portion of the pumped fluid into said cavity;

fluid outlet means on said jacket in fluid communication with said cavity and connected with the existing pump intake port for directing fluid from said cavity to the pump intake port;

discharge connection means having one end connected with the existing discharge port of the pump to allow the discharged fluid to flow therethrough and another end connected with said fluid inlet means on said jacket to introduce a portion of the discharged fluid flowing therethrough into said cavity; and temperature responsive flow control means in said discharge connection means for controlling fluid flow to said jacket cavity;

said fluid inlet means, said discharge connection means, and said fluid outlet means connected in fluid communication with the pump to create a pressure differential within said jacket cavity between said fluid inlet means and said fluid outlet means to introduce fluid into said cavity and draw fluid from said cavity and recirculate it through the pump; and said temperature responsive control means allowing a portion of the discharged fluid to flow into said jacket cavity when the discharged fluid is at a first predetermined temperature and preventing a portion of the discharged fluid from flowing into said cavity when the discharged fluid is at a second predetermined temperature.

11. The heat exchanger of claim 10 wherein said discharge connection means includes a supply tee connected with the existing discharge port of the pump and an outlet connected with said fluid inlet means; and said temperature responsive flow control means includes thermostat means having a heat sensing portion positioned in the path of the fluid flowing through said supply tee, a movable valve operatively connected with said heat sensing portion, and a valve seat in said supply tee outlet;

said valve movable between a normally open position above said valve seat allowing fluid flow through said supply tee outlet and a closed position engaged in sealing relation with said valve seat preventing fluid flow through said supply tee outlet.

12. A heat exchanger for use with a motor driven fluid pump of the type having a low pressure intake port and a high pressure discharge port, wherein the pump motor has an outwardly curved upper surface, said heat exchanger comprising:

an arcuate heat exchange jacket formed of resilient material;

said jacket having a hollow enclosed cavity surrounded by a curved inner wall conforming generally to the shape of the pump motor outwardly curved upper surface, an outer wall in spaced relation to said inner wall, end walls at each end, a thick wall portion partially within said cavity of sufficient thickness to allow said jacket to be drilled and tapped to receive mounting hardware, and parallel laterally spaced longitudinal bottom walls, said walls joined together to form a unitary structure;

an aperture extending through said thick wall portion to form a passageway through said jacket isolated from fluid within said cavity and through which wires may be passed to connect the interior of the pump motor to motor components or controls mounted exterior of the pump motor;

said jacket configured to subtend the curved upper surface of the pump motor when installed thereon to maintain heat exchange relationship between the pump motor and a fluid within said cavity with said parallel laterally spaced longitudinal bottom walls of said heat exchange jacket disposed in laterally opposed parallel relation adjacent a horizontal axis extending through the mid section of the pump motor;

fluid inlet means on said jacket in fluid communication with said cavity for directing a portion of the pumped fluid into said cavity;

fluid outlet means on said jacket in fluid communication with said cavity and connected with the existing pump intake port for directing fluid from said cavity to the pump intake port;

said fluid inlet means and said fluid outlet means connected in fluid communication with the pump to create a pressure differential within said jacket cavity between said fluid inlet means and said fluid outlet means to introduce fluid into said cavity and draw fluid from said cavity and recirculate it through the pump.

13. A fluid heating and circulation system for an enclosure containing a body of fluid and having fluid inlet means and fluid drain means, said fluid heating and circulation system comprising;

a fluid pump having a low pressure intake port and a high pressure discharge port;

first conduit means connected between said fluid pump intake port and the enclosure drain means for drawing fluid from the enclosure;

second conduit means connected between said fluid pump discharge port and the enclosure inlet means for supplying fluid to the enclosure inlet means, a pump motor operatively connected to said fluid pump to cause it to draw fluid into said intake port and discharge it from said discharge port, said pump motor having a curved upper surface;

an arcuate heat exchange jacket formed of resilient plastic material and having a hollow enclosed cavity surrounded by an arcuate curved inner wall having a diameter approximately the same as said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said jacket disposed in laterally opposed parallel relation adjacent a horizontal axis extending through the mid section of said pump motor;

fluid inlet means on said jacket in fluid communication with said cavity for directing a portion of the pumped fluid into said cavity;

fluid outlet means on said jacket in fluid communication with said cavity and connected with said first conduit means for directing fluid from said cavity into said first conduit; and said fluid inlet means and said fluid outlet means on said jacket connected in fluid communication with said pump to create a pressure differential within said jacket cavity between said fluid inlet means and said fluid outlet means to introduce fluid into said cavity and draw fluid from said cavity and recirculate it through said motor driven pump and through said second conduit means and the enclosure inlet means to supply heated fluid to the enclosure.

14. The fluid heating and circulation system of claim 13 wherein said jacket is formed of plastic material sufficiently resilient such that when pressed downwardly on the curved upper surface of said pump motor, the parallel longitudinal bottom walls of said heat exchange jacket will flex outwardly and pass the mid section of said pump motor to enable said jacket to snap into place over the curved upper surface of said pump motor for maintaining the heat exchange relationship between said pump motor and a fluid within said cavity.

15. A fluid heating and circulation system for an enclosure containing a body of fluid and having fluid inlet means and fluid drain means, said fluid heating and circulation system comprising;

a fluid pump having a low pressure intake port and a high pressure discharge port;

first conduit means connected between said fluid pump intake port and the enclosure drain means for drawing fluid from the enclosure;

second conduit means connected between said fluid pump discharge port and the enclosure inlet means for supplying fluid to the enclosure inlet means, a pump motor operatively connected to said fluid pump to cause it to draw fluid into said intake port and discharge it from said discharge port, said pump motor having a curved upper surface;

an arcuate heat exchange jacket formed of resilient material and having a hollow enclosed cavity surrounded by a curved inner wall conforming generally to the shape of said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said jacket disposed in laterally opposed parallel relation adjacent a horizontal axis extending through the mid section of said pump motor;

fluid inlet means on said jacket in fluid communication with said cavity for directing a portion of the pumped fluid into said cavity;

a pair of fluid outlet means on said jacket in fluid communication with said cavity each connected with said first conduit means for directing fluid from said cavity into said first conduit; and said fluid inlet means and said pair of fluid outlet means on said jacket connected in fluid communication with said pump to create a pressure differential within said jacket cavity between said fluid inlet means and said pair of fluid outlet means to introduce fluid into said cavity and draw fluid from said cavity and recirculate it through said motor driven pump and through said second conduit means and the enclosure inlet means to supply heated fluid to the enclosure.

16. A fluid heating and circulation system for an enclosure containing a body of fluid and having fluid inlet means and fluid drain means, said fluid heating and circulation system comprising;

a fluid pump having a low pressure intake port and a high pressure discharge port;

first conduit means connected between said fluid pump intake port and the enclosure drain means for drawing fluid from the enclosure;

second conduit means connected between said fluid pump discharge port and the enclosure inlet means for supplying fluid to the enclosure inlet means, a pump motor operatively connected to said fluid pump to cause it to draw fluid into said intake port and discharge it from said discharge port, said pump motor having a curved upper surface;

an arcuate heat exchange jacket formed of resilient material and having a hollow enclosed cavity surrounded by a curved inner wall conforming generally to the shape of said pump motor curved Upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said jacket disposed in laterally opposed parallel relation adjacent a horizontal axis extending through the mid section of said pump motor;

fluid inlet means on said jacket in fluid communication with said cavity for directing a portion of the pumped fluid into said cavity;

fluid outlet means on said jacket in fluid communication with said cavity and connected with said first conduit means for directing fluid from said cavity into said first conduit;

discharge connection means having one end connected with said second conduit to allow discharged fluid to flow therethrough and another end connected with said fluid inlet means on said jacket to introduce a portion of the discharged fluid flowing therethrough into said cavity;

temperature responsive flow control means in said discharge connection means for controlling fluid flow to said cavity;

said fluid inlet means, said discharge connection means, and said fluid outlet means on said jacket connected in fluid communication with said pump to create a pressure differential within said jacket cavity between said fluid inlet means and said fluid outlet means to introduce fluid into said cavity and draw fluid from said cavity and recirculate it through said motor driven pump and through said second conduit means and the enclosure inlet means to supply heated fluid to the enclosure; and said temperature responsive control means allowing a portion of the discharged fluid to flow into said cavity when the discharged fluid is at a first predetermined temperature and preventing a portion of the discharged fluid from flowing into said cavity when the discharged fluid is at a second predetermined temperature.

17. A fluid heating and circulation system for an enclosure containing a body of fluid and having fluid inlet means and fluid drain means, said fluid heating and circulation system comprising;

a fluid pump having a low pressure intake port and a high pressure discharge port;

first conduit means connected between said fluid pump intake port and the enclosure drain means for drawing fluid from the enclosure;

second conduit means connected between said fluid pump discharge port and the enclosure inlet means for supplying fluid to the enclosure inlet means, a pump motor operatively connected to said fluid pump to cause it to draw fluid into said intake port and discharge it from said discharge port, said pump motor having a curved upper surface;

an arcuate heat exchange jacket formed of resilient material and having a hollow enclosed cavity surrounded by a curved inner wall conforming generally to the shape of said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said jacket disposed in laterally opposed parallel relation adjacent a horizontal axis extending through the mid section of said pump motor;

fluid inlet means on said jacket in fluid communication with said cavity for directing a portion of the pumped fluid into said cavity;

a pair of laterally spaced fluid outlet means on said jacket at one end in fluid communication with said cavity and at least one of which is connected with said first conduit for directing fluid from said cavity into said first conduit;

said jacket parallel laterally spaced longitudinal bottom walls have parallel interior surfaces facing the interior of said cavity which are inclined in the same direction at an angle relative to a longitudinal axis of said motor to drain fluid toward said pair of outlet means at one end of said jacket; and said fluid inlet means and said pair of fluid outlet means on said jacket connected in fluid communication with said pump to create a pressure differential within said jacket cavity between said fluid inlet means and said pair of fluid outlet means to introduce fluid into said cavity and draw fluid from said cavity and recirculate it through said motor driven pump and through said second conduit means and the enclosure inlet means to supply heated fluid to the enclosure.

18. A hot tub for containing a body of fluid with a heating and circulation system for heating the fluid contained therein comprising:

an enclosure for containing a body of fluid and having fluid inlet means and fluid drain means;

a fluid pump having a low pressure intake port and a high pressure discharge port;

first conduit means connected between said fluid pump intake port and said enclosure drain means for drawing fluid from said enclosure;

second conduit means connected between said fluid pump discharge port and said enclosure inlet means for supplying fluid to said enclosure inlet means;

a pump motor connected to said fluid pump to cause it to draw fluid into said intake port and discharge it from said discharge port, said motor having a curved upper surface;

an arcuate heat exchange jacket formed of resilient plastic material and having a hollow enclosed cavity surrounded by an arcuate curved inner wall having a diameter approximately the same as said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said heat exchange jacket disposed in laterally opposed parallel relation adjacent a horizontal axis extending through the mid section of said pump motor;

fluid inlet means on said jacket in fluid communication with said cavity for directing a portion of the pumped fluid into said cavity;

fluid outlet means on said jacket in fluid communication with said cavity and connected with said first conduit means for directing fluid from said cavity into said first conduit; and said fluid inlet means and said fluid outlet means on said jacket connected in fluid communication with said pump to create a pressure differential within said jacket cavity between said fluid inlet means and said fluid outlet means to introduce fluid into said cavity and draw fluid from said cavity and recirculate it through said pump and through said second conduit means and said enclosure inlet means to supply heated fluid to said enclosure.

19. The hot tub of claim 18 wherein said jacket is formed of plastic material sufficiently resilient such that when pressed downwardly on the curved upper surface of said pump motor, the parallel laterally spaced longitudinal bottom walls of said heat exchange jacket will flex outwardly and pass the mid section of said pump motor to enable said jacket to snap into place over the curved upper surface of said pump motor for maintaining the heat exchange relationship between said pump motor and a fluid within said cavity.

20. A hot tub for containing a body of fluid with a heating and circulation system for heating the fluid contained therein comprising:

an enclosure for containing a body of fluid and having fluid inlet means and fluid drain means;

a fluid pump having a low pressure intake port and a high pressure discharge port;

first conduit means connected between said fluid pump intake port and said enclosure drain means for drawing fluid from said enclosure;

second conduit means connected between said fluid pump discharge port and said enclosure inlet means for supplying fluid to said enclosure inlet means;

a pump motor connected to said fluid pump to cause it to draw fluid into said intake port and discharge it from said discharge port, said motor having a curved upper surface;

an arcuate heat exchange jacket formed of resilient material and having a hollow enclosed cavity surrounded by a curved inner wall conforming generally to the shape of said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said heat exchange jacket disposed in laterally opposed parallel relation adjacent a horizontal axis extending through the mid section of said pump motor;

fluid inlet means on said jacket in fluid communication with said cavity for directing a portion of the pumped fluid into said cavity;

a pair of fluid outlet means on said jacket in fluid communication with said cavity and each connected with said first conduit means for directing fluid from said cavity into said first conduit; and said fluid inlet means and said pair of fluid outlet means on said jacket connected in fluid communication with said pump to create a pressure differential within said jacket cavity between said fluid inlet means and said pair of fluid outlet means to introduce fluid into said cavity and draw fluid from said cavity and recirculate it through said pump and through said second conduit means and said enclosure inlet means to supply heated fluid to said enclosure.

21. A hot tub for containing a body of fluid with a heating and circulation system for heating the fluid contained therein comprising:

an enclosure for containing a body of fluid and having fluid inlet means and fluid drain means;

a fluid pump having a low pressure intake port and a high pressure discharge port;

first conduit means connected between said fluid pump intake port and said enclosure drain means for drawing fluid from said enclosure;

second conduit means connected between said fluid pump discharge port and said enclosure inlet means for supplying fluid to said enclosure inlet means;

a pump motor connected to said fluid pump to cause it to draw fluid into said intake port and discharge it from said discharge port, said motor having a curved upper surface;

an arcuate heat exchange jacket formed of resilient material and having a hollow enclosed cavity surrounded by a curved inner wall conforming generally to the shape of said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said heat exchange jacket disposed in laterally opposed parallel relation adjacent a horizontal axis extending through the mid section of said pump motor;

fluid inlet means on said jacket in fluid communication with said cavity for directing a portion of the pumped fluid into said cavity;

fluid outlet means on said jacket in fluid communication with said cavity and connected with said first conduit means for directing fluid from said cavity into said first conduit;

discharge connection means having one end connected with said second conduit to allow discharged fluid to flow therethrough and another end connected with said fluid inlet means on said jacket to introduce a portion of the discharged fluid flowing therethrough into said cavity;

temperature responsive flow control means in said discharge connection means for controlling fluid flow to said jacket cavity;

said fluid inlet means, said discharge connection means, and said fluid outlet means on said jacket connected in fluid communication with said pump to create a pressure differential within said jacket cavity between said fluid inlet means and said fluid outlet means to introduce fluid into said cavity and draw fluid from said cavity and recirculate it through said pump and through said second conduit means and said enclosure inlet means to supply heated fluid to said enclosure; and said temperature responsive flow control means allowing a portion of the discharged fluid to flow into said jacket cavity when the discharged fluid is at a first predetermined temperature and preventing a portion of the discharged fluid from flowing into said cavity when the discharged fluid is at a second predetermined temperature.

22. A hot tub for containing a body of fluid with a heating and circulation system for heating the fluid contained therein comprising:

an enclosure for containing a body of fluid and having fluid inlet means and fluid drain means;

a fluid pump having a low pressure intake port and a high pressure discharge port;

first conduit means connected between said fluid pump intake port and said enclosure drain means for drawing fluid from said enclosure;

second conduit means connected between said fluid pump discharge port and said enclosure inlet means for supplying fluid to said enclosure inlet means;

a pump motor connected to said fluid pump to cause it to draw fluid into said intake port and discharge it from said discharge port, said motor having a curved upper surface;

an arcuate heat exchange jacket formed of resilient material and having a hollow enclosed cavity surrounded by a curved inner wall conforming generally to the shape of said pump motor curved upper surface, an outer wall in spaced relation to said inner wall, end walls at each end, and parallel laterally spaced longitudinal bottom walls, said walls joined together to form a unitary structure;

said jacket configured to subtend the curved upper surface of said pump motor when installed thereon to maintain heat exchange relation between said pump motor and fluid within said cavity with said parallel laterally spaced longitudinal bottom walls of said heat exchange jacket disposed in laterally opposed parallel relation adjacent a horizontal axis extending through the mid section of said pump motor;

fluid inlet means on said jacket in fluid communication with said cavity for directing a portion of the pumped fluid into said cavity;

a pair of laterally spaced fluid outlet means on said jacket at one end in fluid communication with said cavity and at least one of which is adapted for connection to said first conduit for directing fluid from said cavity into said first conduit;

said jacket parallel laterally spaced longitudinal bottom walls have parallel interior surfaces facing the interior of said cavity which are inclined in the same direction at an angle relative to a longitudinal axis of said motor to drain fluid toward said pair of outlet means at one end of said jacket; and said fluid inlet means and said at least one fluid outlet means on said jacket connected in fluid communication with said pump to create a pressure differential within said jacket cavity between said fluid inlet means and said fluid outlet means to introduce fluid into said cavity and draw fluid from said cavity and recirculate it through said pump and through said second conduit means and said enclosure inlet means to supply heated fluid to said enclosure.

\* \* \* \* \*